(12) United States Patent
Takeda et al.

(10) Patent No.: US 7,479,079 B2
(45) Date of Patent: Jan. 20, 2009

(54) VARIABLE SPEED GENERATOR FOR A HUMAN POWERED VEHICLE

(75) Inventors: Kazuhiro Takeda, Sakai (JP); Satoshi Kitamura, Kitakatsuragi-gun (JP); Takumi Onogi, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 290 days.

(21) Appl. No.: 11/420,743

(22) Filed: May 27, 2006

(65) Prior Publication Data

US 2006/0287151 A1 Dec. 21, 2006

(30) Foreign Application Priority Data

Jun. 20, 2005 (JP) ............................ 2005-179947

(51) Int. Cl.
*F16H 3/46* (2006.01)
(52) U.S. Cl. ........................................................ 475/3
(58) Field of Classification Search ............... 310/67 A
See application file for complete search history.

(56) References Cited

U.S. PATENT DOCUMENTS

| | | | |
|---|---|---|---|
| 2,430,705 A | 11/1947 | Brown | |
| 5,268,602 A | 12/1993 | Schwaller | |
| 7,119,668 B2 | 10/2006 | Kitamura et al. | |
| 2005/0159263 A1 | 7/2005 | Urabe | |
| 2005/0252750 A1 | 11/2005 | Matsueda et al. | |
| 2005/0264112 A1* | 12/2005 | Tanaka et al. | 310/75 C |

FOREIGN PATENT DOCUMENTS

| | | |
|---|---|---|
| EP | 1122157 A2 | 8/2001 |
| EP | 1510448 A1 | 3/2005 |
| GB | 894242 | 4/1962 |
| JP | 6-88544 B2 | 11/1994 |
| JP | 6-88545 B2 | 11/1994 |
| JP | 6-88546 B2 | 11/1994 |
| TW | 572021 Y | 1/2004 |
| TW | 200404966 A | 4/2004 |

OTHER PUBLICATIONS

Renak brochure, "Der Nabendynamo Enparlite 2," published on or about May 10, 2002 in Germany.
Patent Abstracts of Japan, vol. 015, No. 225, Jun. 10, 1991, for JP 03-067791 A, published Mar. 22, 1991.

(Continued)

*Primary Examiner*—Sherry L Estremsky
*Assistant Examiner*—Edwin A Young
(74) *Attorney, Agent, or Firm*—James A. Deland (57) ABSTRACT

A generator for a human powered vehicle comprises a hub shaft structured to be mounted to the human powered vehicle, a hub shell mounted to rotate relative to the hub shaft, a power generating mechanism including a coil and a magnet that rotate relative to each other, and a rotating member structured to rotate relative to the hub shaft, wherein at least one of the coil or the magnet rotate together with the rotating member. A transmission communicates rotation from an input member to an output member corresponding to a plurality of gear ratios, and a switching unit couples the rotating member to the transmission so that the rotating member rotates at a plurality of speeds relative to the hub shell.

20 Claims, 5 Drawing Sheets

OTHER PUBLICATIONS

European search report for EP 06012652, the European application that is the equivalent of this application, dated Sep. 15, 2006.

Taiwanese search report dated Aug. 14, 2007, for TW 095106215, the Taiwanese application that corresponds to this application.

* cited by examiner

VARIABLE SPEED GENERATOR FOR A HUMAN POWERED VEHICLE

BACKGROUND OF THE INVENTION

The present invention is directed to human powered vehicles and, more particularly, to a variable speed generator for a human powered vehicle such as a bicycle.

A generator contained within a wheel hub, typically called a hub dynamo, frequently is fitted to a bicycle. Such a hub dynamo is disclosed in Japanese Patent Publication No. 6-88544. The disclosed dynamo comprises a hub shaft, a hub shell rotatably mounted around the hub shaft, a transmission mechanism that increases the rotational speed of the hub shell to an output member, and a power generating mechanism that has a magnet connected to the output member and a coil fitted to the hub shaft. In such a hub dynamo, the magnet rotates faster than the hub shell so that power generation is high even at low wheel speeds. However, when wheel speed is high, the dynamo may produce excessive voltage and cause malfunction or destruction of electrical components, such as lamps powered by the dynamo, unless special protective circuitry is added to the system.

SUMMARY OF THE INVENTION

The present invention is directed to various features of a generator for a human powered vehicle. In one embodiment, a generator for a human powered vehicle comprises a hub shaft structured to be mounted to the human powered vehicle, a hub shell mounted to rotate relative to the hub shaft, a power generating mechanism including a coil and a magnet that rotate relative to each other, and a rotating member structured to rotate relative to the hub shaft. At least one of the coil or the magnet rotates together with the rotating member. A transmission communicates rotation from an input member to an output member corresponding to a plurality of gear ratios, and a switching unit couples the rotating member to the transmission so that the rotating member rotates at a plurality of speeds relative to the hub shell. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
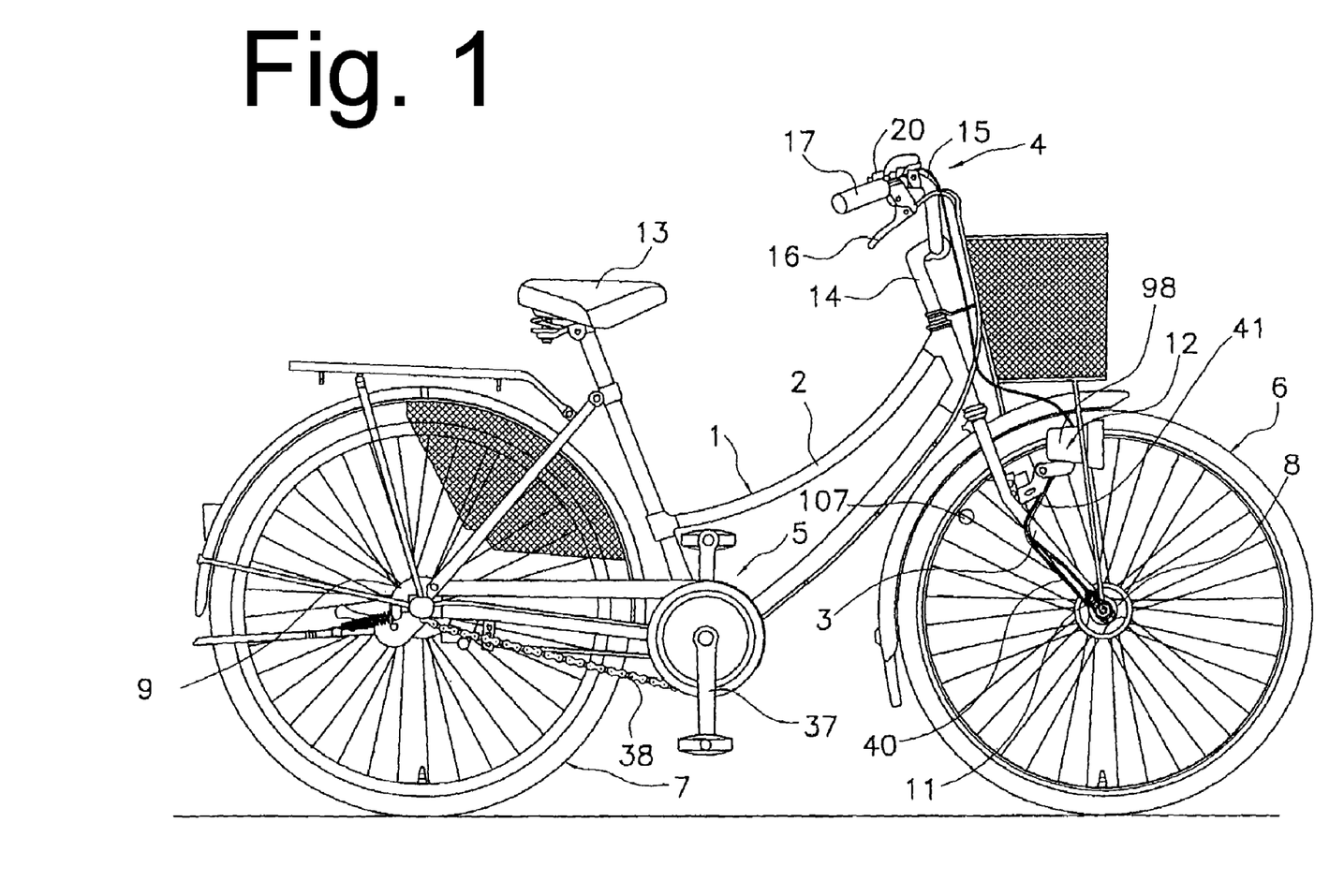
FIG. 1 is a side view of a particular embodiment of a bicycle.

FIG. 1 is a side view of a particular embodiment of a bicycle 1. Bicycle 1 is a light road bicycle, and it comprises a double loop type-frame 2; a front fork 3 mounted to frame 2 for rotation around an inclined axis; a handlebar assembly 4 mounted to the upper part of fork 3; a front wheel 6 including an alternating current generating hub dynamo 8 rotatably attached to the lower part of fork 3; a rear wheel 7 rotatably attached to the rear of frame 2; a saddle 13 mounted to the upper middle part of frame 2; and a drive unit 5 comprising a gear crank 37 rotatably mounted to the lower middle part of frame 2, a chain 38, and a three-speed internal hub transmission 9.

Handlebar assembly 4 comprises a handlebar stem 14 attached to the upper part of front fork 3 and a handlebar 15 attached to the upper part of stem 14. Brake lever assemblies 16 are provided on both ends of handlebar 15 adjacent to grips 17(only one brake lever assembly 16 is shown in FIG. 1). A shift control unit 20 is mounted to handlebar 15 for controlling the operation of internal hub transmission 9.

Figure 3:
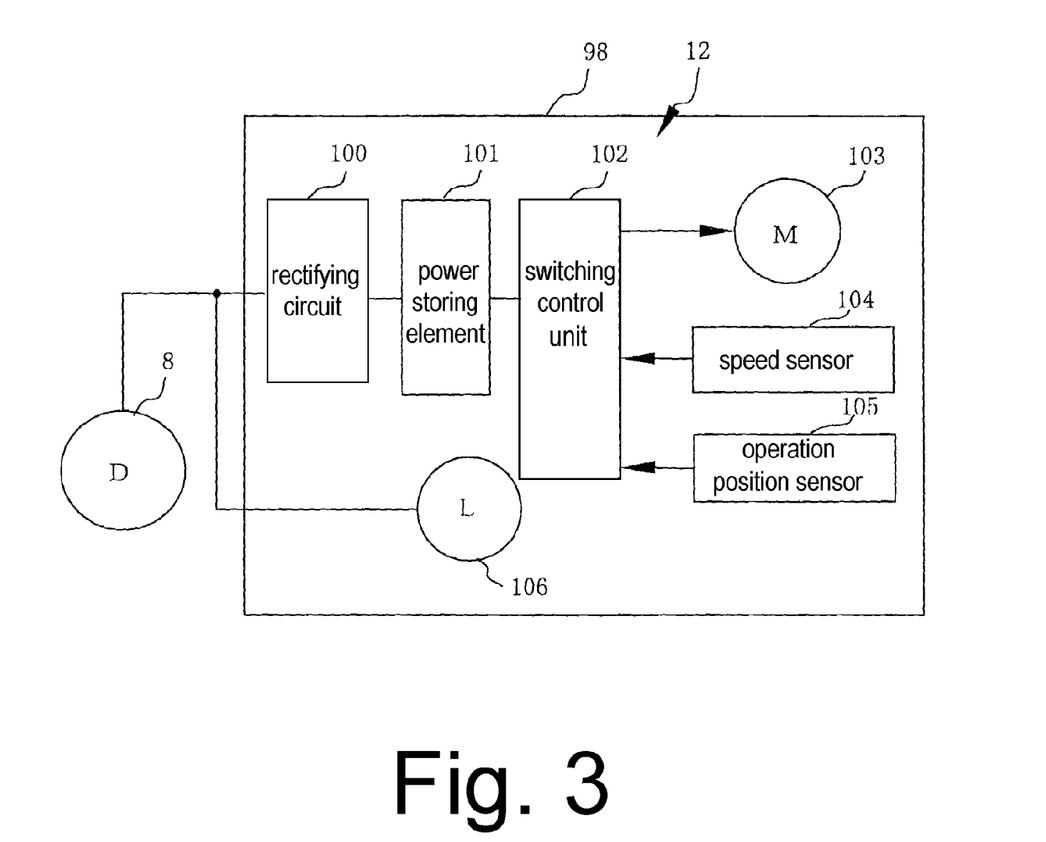
FIG. 3 is a block diagram of a particular embodiment of electrical components used with the hub dynamo.

A lamp case 98 is attached to front fork 3 and is connected to hub dynamo 8 through electrical wiring 40, a shift cable 41 and a bell crank 11 of known construction. As shown in FIG. 3, lamp case 98 houses a switching unit 12 and a lamp 106. Switching unit 12 comprises a rectifying circuit 100 that rectifies an alternating current from hub dynamo 8 into a direct current, a power storing element 101 that stores the rectified direct-current power, a switching control unit 102 and a motor unit 103 that operate using the power stored in power storing element 101, a speed sensor 104 that provides speed signals to switching control unit 102, and an operation position sensor 105 that provides operation position signals to switching control unit 102. Speed sensor 104 may comprise a reed switch that detects the passage of a speed sensing element 107 (FIG. 1) such as a magnet attached to front wheel 6. Motor unit 103 includes a motor and an integrated cable winding unit that pulls and releases shift cable 41 to two positions. Operation position sensor 105 detects in which of these two positions shift cable 41 is located. Switching control unit 102 includes, for example, a microcomputer that controls motor unit 103 in accordance with the speed detected by speed sensor 104 to pull and release shift cable 41 is located. the two available positions. For example, when the vehicle speed exceeds 20 km/hr switching control unit 102 may operate motor unit 103 to place shift cable 41 into a high speed position, whereas switching control unit 102 may operate motor unit 103 to place shift cable 41 into a low speed position when the vehicle speed falls below 20 km/h.

Figure 2:
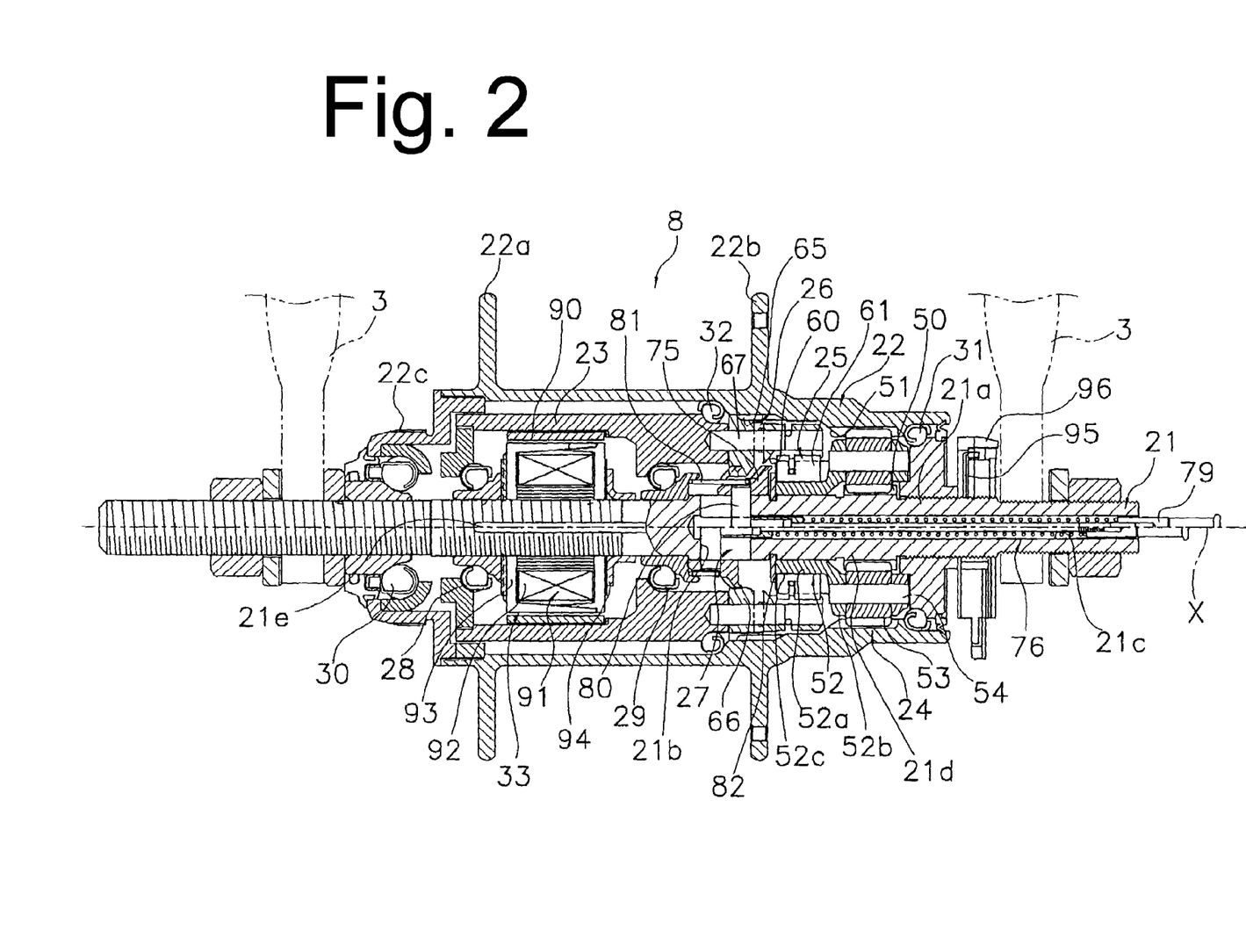
FIG. 2 is a cross sectional view of a particular embodiment of a hub dynamo.

As shown in FIG. 2, hub dynamo 8 comprises a hub shaft 21 structured to be mounted to the bottom end of front fork 3, a hub shell 22 structured to rotate around hub shaft 21, a rotating member in the form of a driven body 23 disposed radially inwardly of hub shell 22 and structured to rotate around hub shaft 21, a planetary gear transmission 24 that transmits rotation of hub shell 22 to driven body 23 through two power transmitting paths, a first one-way clutch 25 that transmits rotation from planetary gear transmission 24 to driven body 23 in only one direction, a second one-way clutch 26 that transmits rotation of hub shell 22 to driven body 23 in only one direction, and a clutch control mechanism 27 that controls the operation of second one-way clutch 26. A power generating mechanism 33 is disposed between driven body 23 and hub shaft 21.

Both ends of hub shaft 21 are fixed to front fork 3. Hub shaft 21 includes a large-diameter portion 21a. An axially elongated hole 21b diametrically extends through large-diameter portion 21a of hub shaft 21 for accommodating a key 80 for a clutch cam 75 of clutch control mechanism 27, and a push rod hole 21c extends axially from elongated hole 21b through the right end of hub shaft 21 for housing a moving mechanism 76 of clutch control mechanism 27. A portion of large diameter portion 21a forms a sun gear 50 of planetary gear transmission 24.

Hub shell 22 is a substantially cylindrical member formed in two pieces, and it is rotatably supported on hub shaft 21 at both ends by bearing assemblies 30 and 31. A pair of hub flanges 22a and 22b are formed on an outer peripheral surface of hub shell 22, and a screw portion 22c for fitting a front brake is formed at the left end of hub shell 22. Ratchet teeth 65 that form a part of second one-way clutch 26 are formed on the inner peripheral surface of hub shell 22 to the right of bearing assembly 32, and gear teeth that form a ring gear 51 of planetary gear transmission 24 are formed on the inner peripheral surface of hub shell 22 to the right of ratchet teeth 65.

Driven body 23 is a substantially cylindrical member that is rotatably supported on hub shaft 21 by bearing assemblies 28 and 29, and hub shell 22 is rotatably supported on driven body 23 by a bearing assembly 32. Ratchet teeth 60 that form a part of first one-way clutch 25 are formed on the inner peripheral surface of the right end of driven body 23.

Planetary gear transmission 24 includes sun gear 50 formed on hub shaft 21, ring gear 51 formed on the inner peripheral surface of hub shell 22, a planet gear carrier 52 rotatably supported by large-diameter portion 21d of hub shaft 21, and a plurality of (e.g., four) planet gears 53 rotatably supported by planet gear carrier 52. Planet gear carrier 52 comprises a cylindrical portion 52a, through which hub shaft 21 passes, and a collar portion 52b that extends radially outwardly from the right side of cylindrical portion 52a. A snap ring 82 is fitted to hub shaft 21 to prevent leftward axial movement of planet gear carrier 52. Bearing assembly 31 supports the right end of collar portion 52b. Since the left end of planet gear carrier 52 is supported by hub shaft 22 and the right end of planet gear carrier 52 is supported by bearing assembly 31, planet gear carrier 52 is very stable during operation and does not tilt. Four gear shafts 54 are fixed to collar portion 52b for rotatably supporting planet gears 53. Planet gears 53 mesh with sun gear 50 and ring gear 51.

Planetary gear transmission 24 communicates reduced rotation of hub shell 22 to driven body 23. A gear ratio GR of planetary gear transmission 24 can be expressed by the following expression:

$$GR=1/(1+(Zs/Zr))$$

where Zr is the number of teeth on ring gear 51 and Zs is the number of teeth on sun gear 50. When the number of teeth Zs of sun gear 50 is set at 18 T, for example, and the number of teeth Zr of ring gear 51 is set at 46T, for example, then $$GR=1/(1+(15/46))=0.753$$

In this embodiment, first one-way clutch 25 is a ratchet and pawl type clutch, and it comprises a plurality of (e.g., two) pawls 61 swingably mounted on a recessed outer peripheral surface 52c of cylindrical portion 52a of planet gear carrier 52, together with the ratchet teeth 60 formed on the inner peripheral surface of driven body 23. Pawls 61 are biased radially outwardly in the direction of engagement with ratchet teeth 60 by a conventional spring. Ratchet teeth 60 are formed into a sawtooth shape so that only rotation in the traveling direction of planet gear carrier 52 is transmitted to driven body 23. When driven body 23 rotates in the traveling direction at a higher speed than planet gear carrier 52, or when planet gear carrier 52 rotates in the reverse direction, then pawls 61 merely slide over the inclined surfaces of ratchet teeth 60, and rotation of driven body 23 is not transmitted to planet gear carrier 52.

In this embodiment, second one-way clutch 26 also is a ratchet and pawl type clutch, and it comprises a plurality of (e.g., two) pawls 66 swingably mounted on pawl shafts 67 mounted at the right end of driven body 23, together with the ratchet teeth 65 formed on the inner peripheral surface of hub shell 22. Pawls 66 are biased radially outwardly in the direction of engagement with ratchet teeth 65 by a conventional spring. Ratchet teeth 65 also are formed into a sawtooth shape so that only rotation in the traveling direction of hub shell 22 is transmitted to driven body 23. When hub shell 22 rotates in the reverse direction, then pawls 66 merely slide over the inclined surfaces of ratchet teeth 65, and rotation of hub shell 22 is not transmitted to driven body 23.

Clutch control mechanism 27 includes cylindrical clutch cam 75 axially movably mounted around hub shaft 21 and a moving mechanism 76 that reciprocally moves clutch cam 75 axially between a clutch engaging position shown in the upper portion of FIG. 2 (where second one-way clutch engages 26 engages hub shell 22 ) and a clutch disengaging position shown in the lower portion of FIG. 2 (where second one-way clutch engages 26 is disengaged from hub shell 22 ). Clutch cam 75 is biased rightward by a return spring 81 disposed in a compressed state between bearing assembly 29 and clutch cam 75. Moving mechanism 76 comprises a push rod 79 and a key 80. Both ends of key 80, which has a rod shape, are connected to clutch cam 75. Key 80 extends through and is axially guided by opening 21b in hub shaft 21. Key 80 contacts the left end of push rod 79, wherein push rod 79 is slidably disposed within push rod hole 21 c of hub shaft 21. Push rod 79 may be pressed to the left by bell crank 11 (FIG. 1) fitted to the right end of the hub shaft 21 and connected to switching unit 12 by shift cable 41. When push rod 79 is pressed to the left by bell crank 11, push rod 79 presses key 80 to move clutch cam 75 to the clutch disengaging position wherein clutch cam 75 disengages pawls 66 from ratchet teeth 65 by pressing them radially inwardly. When bell crank 11 retreats, then clutch cam 75, key 80 and push rod 79 move axially to the right in accordance with the biasing force of return spring 81 to the clutch engaging position, wherein pawls 66 move radially outwardly to reengage ratchet teeth 65.

As noted previously, power generating mechanism 33 is disposed between driven body 23 and hub shaft 21 for generating power in response to relative rotation between driven body 23 and hub shaft 21. Power generating mechanism 33 comprises a magnet 90 and a fixed unit 91, wherein magnet 90 is fitted to the inner peripheral surface of driven body 23 for rotation therewith, and fixed unit 91 is fixed to hub shaft 21. In this embodiment, magnet 90 comprises four permanent magnets that form alternating N-poles and S-poles spaced apart in the circumferential direction of driven body 23. Fixed unit 91 comprises a ring-shaped coil 92 and a yoke 93 that surrounds coil 92. Coil 92 and yoke 93 are fixed to hub shaft 21 between bearing assembly 28 and a nut 94 so as to be aligned radially inwardly from magnets 90.

A cord passing groove 21e is formed on the outer peripheral surface of hub shaft 21 to accommodate a connecting cord 95 that is connected to coil 92 and communicates the generated power to an output connector 96 mounted to hub shaft 21 outside of hub shell 22. Electric wiring 40 (FIG. 1) communicates the generated power from connector 96 to switching unit 12.

In operation, when switching control unit 102 detects the bicycle traveling below the selected speed (e.g., 20 km/h) then switching control unit 102 provides signals to motor 103 to cause motor 103 to release shift cable 41 so that bell crank 11 allows return spring 81 to push clutch cam 75, key 80 and push rod 79 to the position shown in the upper portion of FIG. 2. As a result, clutch cam 75 is disengaged from pawls 66 of second one-way clutch 26, pawls 66 engage ratchet teeth 65 on hub shell 22, and rotation of hub shell 22 is transmitted directly to driven body 23 through second one-way clutch 26 to maximize power generation. When switching control unit 102 detects the bicycle traveling above the selected speed, then switching control unit 102 provides signals to motor 103 to cause motor 103 to pull shift cable 41 so that bell crank 11 presses push rod 79, key 80 and clutch cam 75 to the position shown in the lower portion of FIG. 2. As a result, clutch cam 75 pushes pawls 66 of second one-way clutch 26 radially inwardly, pawls 66 disengage from ratchet teeth 65 on hub shell 22, and rotation of hub shell 22 is transmitted to driven body 23 at a reduced speed through ring gear 51, planet gears 53, planet gear carrier 52 and first one-way clutch 25, thereby suppressing undesired increase in generated voltage. The net result is proper voltage generation despite large changes in bicycle speed.

Figure 4:
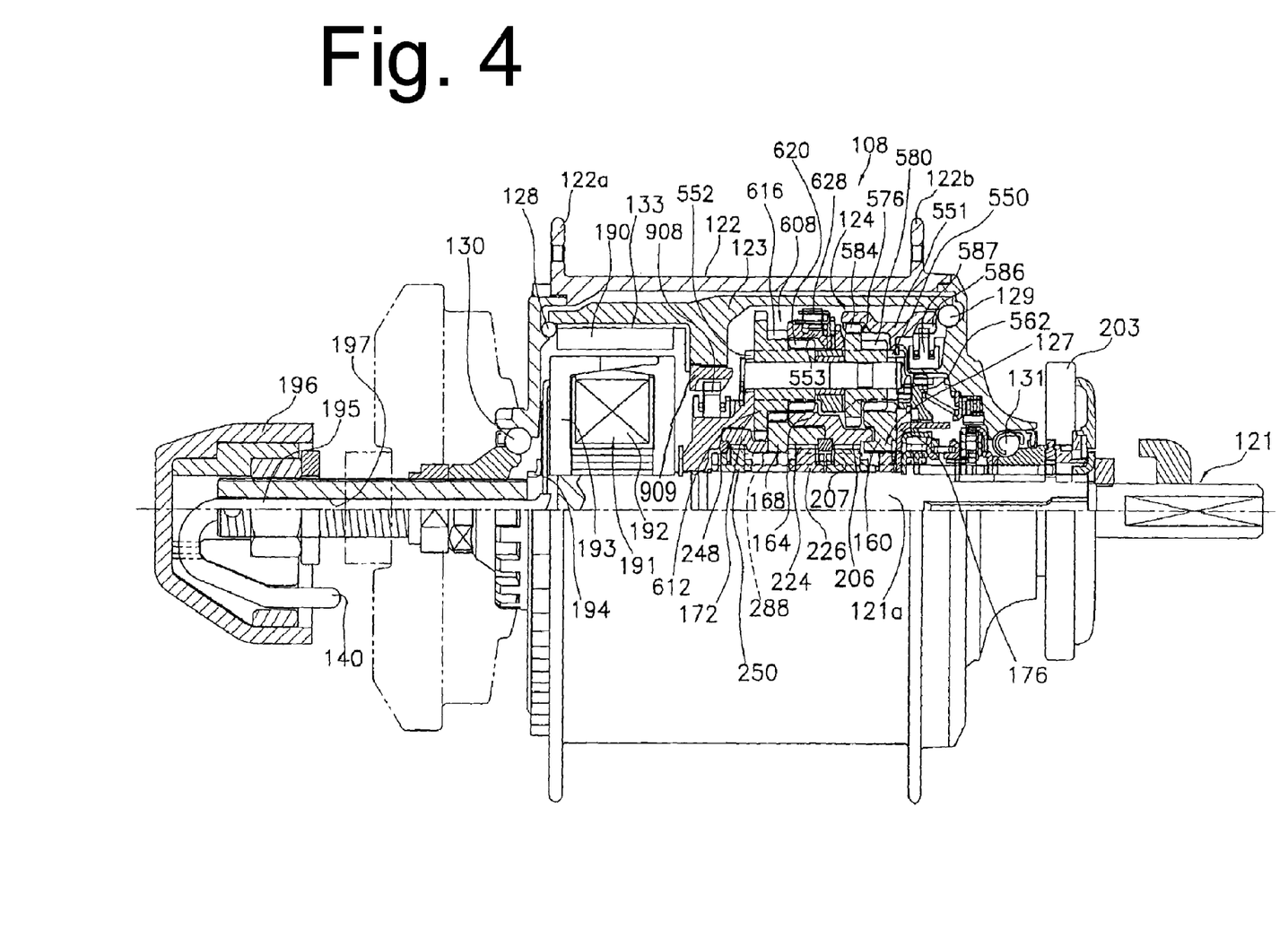
FIG. 4 is a cross sectional view of another embodiment of a hub dynamo.

FIG. 4 is a cross sectional view of another embodiment of a hub dynamo 108. In this embodiment, a planetary gear transmission 124 provides eight power transmitting paths (four speed reducing power transmitting paths, one directly connected power transmitting path and three speed increasing power transmitting paths) as opposed to the two power transmitting paths provided by planetary gear transmission 24 in the first embodiment. In this embodiment, a motor 203 is mounted to hub dynamo 108 rather than to lamp case 98, and operation position sensor 205 is integrated within motor 203 in a known manner. As a result, it is not necessary to provide a shift cable 41 between hub dynamo 108 and lamp case 98. Instead, only electric wiring 40 is provided between lamp case 98 and hub dynamo 108 for power supply and control purposes.

Hub dynamo 108 comprises a hub shaft 121 structured to be mounted to the lower ends of front fork 3, a hub shell 122 rotatably mounted around hub shaft 121, a rotating member in the form of a driven body 123 disposed radially inwardly of hub shell 122 and structured to rotate around hub shaft 121, a planetary gear transmission 124 that transmits rotation of hub shell 122 to driven body 123 through eight power transmitting paths, and a clutch control mechanism 127 for selecting the eight power transmitting paths. A power generating mechanism 133 is disposed between driven body 123 and hub shaft 121.

Both ends of hub shaft 121 are fixed to front fork 3. Hub shaft 121 includes a large-diameter portion 121a that supports planetary gear mechanism 124. Hub shell 122 is a substantially cylindrical member formed in three pieces, and it is rotatably supported in hub shaft 121 by bearing assemblies 130 and 131. A pair of hub flanges 122a and 122b are formed on an outer peripheral surface of hub shell 122, and a screw portion 122c for fitting a front brake is formed at the left end of hub shell 122. Driven body 123 is a substantially cylindrical member that is rotatably supported on hub shell 122 by bearing assemblies 128 and 129.

Planetary gear mechanism 124 includes a first sun gear 160, a second sun gear 164, a third sun gear 168 and a fourth sun gear 172. First sun gear 160 is nonrotatably supported to hub shaft 121, and a clutch cam 176 is mounted to the right side of first sun gear 160. Second sun gear 164 is adjacent to first sun gear 160, and it is rotatably supported around hub shaft 121. Second sun gear 164 includes a plurality of second sun gear ratchet teeth 206 formed on its inner peripheral surface so as to be engaged with a second sun gear pawl 207 that selectively nonrotatably fixes second sun gear 164 to hub shaft 121. Third sun gear 168 is adjacent to second sun gear 164, and it is rotatably supported around hub shaft 121. Third sun gear 168 includes a plurality of third sun gear ratchet teeth 224 formed on its inner peripheral surface so as to be engaged with a third sun gear pawl 226 that selectively nonrotatably fixes third sun gear 168 to hub shaft 121. Fourth sun gear 172 is adjacent to third sun gear 168, and it is rotatably supported around hub shaft 121. Fourth sun gear 172 includes a plurality of fourth sun gear ratchet teeth 248 formed on its inner peripheral surface so as to be engaged with a fourth sun gear pawl 250 that selectively nonrotatably fixes fourth sun gear 172 to hub shaft 121. Each of the pawls 207, 226 and 250 are swingably fitted to hub shaft 121 and are biased to swing radially outwardly to engage their corresponding sun gear ratchet teeth 206, 224 and 248. A pawl control sleeve 288 controls each of the pawls 207, 226 and 250 in a known manner.

Planetary gear mechanism 124 further comprises a first planet gear carrier 550, a first ring gear 551, a second planet gear carrier 552 and a second ring gear 553, all of which are rotatably fitted around hub shaft 121. A clutch ring 562 is mounted to the right side of planet gear carrier 550, and the left side of planet gear carrier 550 is coupled to the right side of planet gear carrier 552 so that planet gear carriers 550 and 552 and clutch ring 562 rotate as a unit.

First planet gear carrier 550 rotatably supports a plurality of planet gears 576. Each planet gear 576 has a small-diameter gear portion 580 and a large-diameter gear portion 584, wherein small-diameter gear portion 580 engages with first sun gear 160, and large-diameter gear portion 584 engages with first ring gear 551. First ring gear 551 includes a plurality of sawtooth-shaped ratchet teeth 586 that are coupled a plurality of pawls 587 swingably mounted circumferentially about an inner ledge of hub shell 122. Pawls 587 are biased to swing radially outwardly to engage ratchet teeth 586 and thereby function as a one-way clutch between hub shell 122 and first ring gear 551.

Second planet gear carrier 552 rotatably supports a plurality of planet gears 608. Each planet gear 608 has a large-diameter gear portion 612, a middle-diameter gear portion 616, and a small-diameter gear portion 620. Large-diameter gear portion 612 engages with fourth sun gear 172, middle-diameter gear portion 616 engages with third sun gear 168, and small-diameter gear portion 620 engages with second sun gear 164. Second planet gear carrier 552 is coupled to driven body 123 through a plurality of pawls 908 swingably mounted circumferentially about the outer peripheral surface of second planet gear carrier 552. Pawls 908 are biased to swing radially outwardly to engage a plurality of sawtooth-shaped ratchet teeth 909 formed on the inner peripheral surface of driven body 123 and thereby function as a one-way clutch between second planet gear carrier 552 and driven body 123. Second ring gear 553 is coupled to hub shell 122 through a conventional roller clutch 628 having, for example, 18 rollers and a cam surface.

Clutch control mechanism 127 controls pawl control sleeve 288 to control each of the pawls 207, 226 and 250. The connection of the various components for each power transmission path of planetary gear transmission 124 is shown in Table 1 and the power transmission path for each shift step is shown in Table 2.

TABLE 1

| Gear | Clutch ring 562 | Sun gear 164 | Sun gear 168 | Sun gear 172 | Gear ratio |
|---|---|---|---|---|---|
| 1 (Low speed) | Release engagement | Free | Free | Free | 0.53 |
| 2 | Release engagement | Free | Free | Lock | 0.64 |

TABLE 1-continued

| Gear | Clutch ring 562 | Sun gear 164 | Sun gear 168 | Sun gear 172 | Gear ratio |
|------|-----------------|--------------|--------------|--------------|------------|
| 3 | Release engagement | Free | Lock | Free | 0.74 |
| 4 | Release engagement | Lock | Lock | Free | 0.85 |
| 5 | Engage | Free | Free | Free | 1.0 |
| 6 | Engage | Free | Free | Lock | 1.22 |
| 7 | Engage | Free | Lock | Free | 1.42 |
| 8 (High speed) | Engage | Lock | Free | Free | 1.62 |

TABLE 2

| Gear | Power transmission path |
|------|-------------------------|
| 1 | Hub shell 124 → pawls 587 → first ring gear 551 → first planet gear carrier 550 (planet gears 576 rotate around fourth sun gear 160) → second planet gear carrier 552 → pawls 908 → driven body 123 |
| 2 | Hub shell 124 → pawls 587 → first ring gear 551 → first planet gear carrier 550 (planet gears 576 rotate around fourth sun gear 160) → second planet gear carrier 552 (planet gears 608 rotate around third sun gear 172) → second ring gear 553 → roller clutch 628→driven body 123 |
| 3 | Hub shell 124 → pawls 587 → first ring gear 551 → first planet gear carrier 550 (planet gears 576 rotate around fourth sun gear 160) → second planet gear carrier 552 (planet gears 608 rotate around second sun gear 168) → second ring gear 553 → roller clutch 628 → driven body 123 |
| 4 | Hub shell 124 → pawls 587 → first ring gear 551 → first planet gear carrier 550 (planet gears 576 rotate around fourth sun gear 160) → second planet gear carrier 552 (planet gear 608 rotates around first sun gear 164) → second ring gear 553 → roller clutch 628 → driven body 123 |
| 5 | Hub shell 124 → clutch ring 562 → first planet gear carrier 550 → second planet gear carrier 552 → pawls 908 → driven body 123 |
| 6 | Hub shell 124 → clutch ring 562 → first planet gear carrier 550 → second planet gear carrier 552 (planet gears 608 rotate around third sun gear 172) → second ring gear 553 → roller clutch 628 → driven body 123 |
| 7 | Hub shell 124 → clutch ring 562 → first planet gear carrier 550 → second planet gear carrier 552 (planet gears 608 rotate around second sun gear 168) → second ring gear 553 → roller clutch 628 → driven body 123 |
| 8 | Hub shell 124 → clutch ring 562 → first planet gear carrier 550 → second planet gear carrier 552 (planet gears 608 rotate around first sun gear 164) → second ring gear 553 → roller clutch 628 → driven body 123 |

When planetary gear transmission 124 is shifted from power transmission path 4 to power transmission path 5, timing of the various connections is set to follow the following sequence in Table 3.

TABLE 3

| Gear | Clutch ring 562 | Sun gear 164 | Sun gear 168 | Sun gear 172 |
|------|-----------------|--------------|--------------|--------------|
| 4 | Release engagement | Lock | Lock | Free |
| (The same as 3) | Release engagement | Free | Lock | Free |
| (The same as 7) | Engage | Free | Lock | Free |
| 5 | Engage | Free | Free | Free |

As noted previously, power generating mechanism 133 is disposed between driven body 123 and hub shaft 121 for generating power in response to relative rotation between driven body 123 and hub shaft 121. Power generating mechanism 133 comprises a magnet 190 and a fixed unit 191, wherein magnet 190 is fitted to the inner peripheral surface of driven body 123 for rotation therewith, and fixed unit 191 is fixed to hub shaft 121. In this embodiment, magnet 190 comprises four permanent magnets that form alternating N-poles and S-poles spaced apart in the circumferential direction of driven body 123. Fixed unit 191 comprises a ring-shaped coil 192 and a yoke 193 that surrounds coil 192. Coil 192 and yoke 193 are fixed to hub shaft 121 between a step of hub shaft 121 and a nut 94 so as to be aligned radially inwardly from magnet 190.

A cord passing groove 197 is formed on the outer peripheral surface of hub shaft 121 to accommodate a connecting cord 195 that is connected to coil 192 and communicates the generated power to an output connector 196 mounted to hub shaft 121 outside of hub shell 122. Electrical wiring 40 (FIG. 1) communicates the generated power from connector 196 to switching unit 112.

Figure 5:
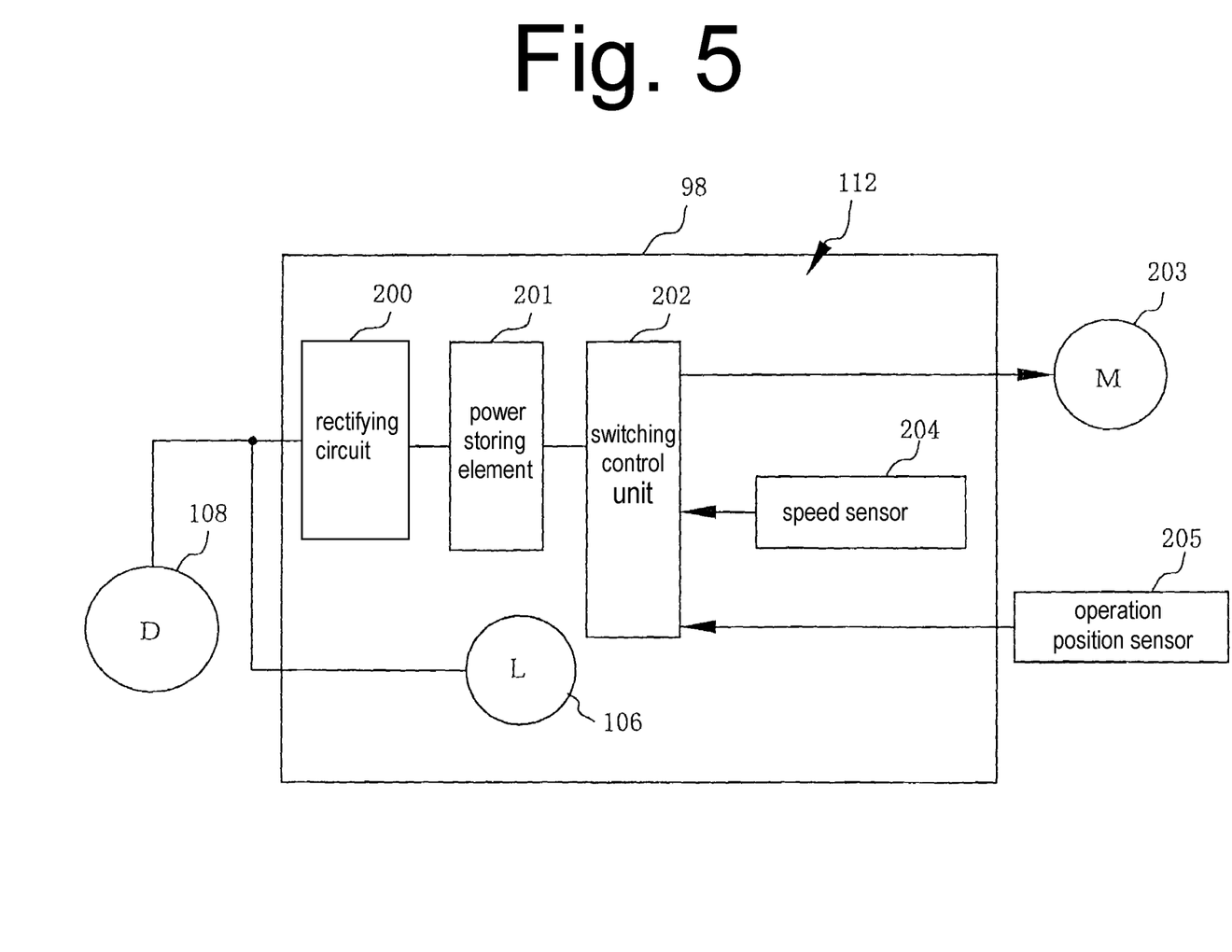
FIG. 5 is a block diagram of a particular embodiment of electrical components used with the hub dynamo shown in FIG. 4.

A lamp case 98 is attached to front fork 3 and is connected to hub dynamo 8 through electrical wiring 40 in a manner similar to the first embodiment. As shown in FIG. 5, lamp case 98 houses a switching unit 112 and a lamp 106. Switching unit 112 comprises a rectifying circuit 200 that rectifies an alternating current from hub dynamo 108 into a direct current, a power storing element 201 that stores the rectified direct-current power, a switching control unit 202, and a speed sensor 204 that provides speed signals to switching control unit 202. Speed sensor 204 may comprise a reed switch that detects the passage of speed sensing element 107 (FIG. 1) such as a magnet attached to front wheel 6. Switching control unit 202 includes, for example, a microcomputer that controls motor unit 203 in accordance with the speed detected by speed sensor 204 to rotate pawl control sleeve 288 into the eight available positions. For example, the vehicle speed may be divided into eight steps between 10 km/hr and 30 km/hr, and switching control unit 202 operates motor unit 203 to rotate pawl control sleeve 288 to place planetary gear transmission 124 into the proper configuration based on the current speed. Switching control unit 202 communicates with motor unit 203 and operation position sensor 205 within motor unit 203 through electrical wiring 40. This embodiment provides finer control over the voltage generation.

While the above is a description of various embodiments of inventive features, further modifications may be employed without departing from the spirit and scope of the present invention. For example, in both of the described embodiments, hub dynamos 8 and 108 were electrically controlled in accordance with the vehicle speed to switch the power transmission paths. However, the power transmission paths may be mechanically switched in accordance with the speed. For example, in the first embodiment, a weight member that rotates with the wheel may be fitted within hub shell 23, and the weight member may be used to switch second one-way clutch 26 between the clutch disengaging and clutch engaging positions. For example, the weight member could move to a switching position radially outward from a reference position at a predetermined speed (for example, 20 km/h or higher) as a result of centrifugal force and thereby move second one-way clutch 26 into the clutch disengaging position to reduce the speed of driven body 23, and then return to the reference position and move the second one-way clutch 26 into the clutch engaging position when the speed is at the predetermined speed or lower. In this case, electrical control is not required, and the control device can be constructed entirely within the hub dynamo.

While the disclosed embodiments showed a hub dynamo fitted to a light roadster, the invention could be applied to all types of bicycles and human powered vehicles. While the disclosed shift mechanisms were constructed using planetary gear transmissions, the shift mechanisms could use gears, pulleys and the like having various configurations. While the switching units 12 and 112 were housed in a lamp case 98, the switching units may be provided separately from lamp case 98, and the speed sensors 104 may be provided separately from the switching units 12 and 112. While a speed sensor detected bicycle speed, the speed may be detected from a signal from the hub dynamo, and the power transmission paths of the planetary gear or other transmission may be corrected accordingly.

The size, shape, location or orientation of the various components may be changed as desired. Components that are shown directly connected or contacting each other may have intermediate structures disposed between them. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A generator for a human powered vehicle comprising:
   a hub shaft structured to be mounted to the human powered vehicle;
   a hub shell mounted to rotate relative to the hub shaft;
   a power generating mechanism including a magnet and a coil that rotate relative to each other to generate an electric current;
   a rotating member structured to rotate relative to the hub shaft;
   wherein at least one of the magnet and the coil rotates together with the rotating member;
   a transmission that communicates rotation from an input member to an output member corresponding to a plurality of nonzero gear ratios; and
   a switching unit that couples the rotating member to the transmission so that the rotating member rotates at a plurality of nonzero speeds relative to the hub shell.

2. The generator according to claim 1 wherein the rotating member rotates coaxially with the hub shell.

3. The generator according to claim 1 wherein the magnet rotates together with the rotating member.

4. The generator according to claim 1 wherein the input member comprises the hub shell.

5. The generator according to claim 1 wherein the output member comprises the rotating member.

6. The generator according to claim 1 wherein the input member comprises the hub shell, and wherein the output member comprises the rotating member.

7. The generator according to claim 1 wherein the switching unit couples the rotating member to the transmission so that the rotating member rotates at a speed less than the hub shell.

8. The generator according to claim 1 wherein the transmission comprises a planetary gear transmission.

9. The generator according to claim 8 wherein the planetary gear transmission comprises:
   a sun gear;
   a planet gear carrier that rotatably supports a planet gear; and
   a ring gear;
   wherein the switching unit couples the rotating member to one of the sun gear, the planet gear carrier or the ring gear so that the rotating member rotates at a speed different from the hub shell.

10. The generator according to claim 9 wherein the switching unit couples the planet gear carrier to the rotating member so that the rotating member rotates at a same speed as the planet gear carrier.

11. The generator according to claim 9 further comprising:
    a speed sensor that senses a rotational speed of a rotating part of the human powered vehicle; and
    wherein the switching unit couples the rotating member to one of the sun gear, the planet gear carrier or the ring gear so that the rotating member rotates at a speed less than the hub shell when the rotating part rotates at a speed above a selected value.

12. The generator according to claim 11 wherein the switching unit couples the rotating member to one of the sun gear, the planet gear carrier or the ring gear so that the rotating member rotates at a same speed as the hub shell when the rotating part rotates at a speed below the selected value.

13. The generator according to claim 1 further comprising a bicycle wheel, wherein the hub shell is mounted to the bicycle wheel.

14. The generator according to claim 13 wherein only the bicycle wheel provides rotational power to rotate the hub shell.

15. The generator according to claim 13 wherein the transmission comprises a planetary gear transmission comprising:
    a sun gear;
    a planet gear carrier that rotatably supports a planet gear; and
    a ring gear;
    wherein the switching unit couples the rotating member to one of the sun gear, the planet gear carrier or the ring gear so that the rotating member rotates at a speed different from the hub shell.

16. The generator according to claim 15 wherein the rotating member rotates coaxially with the hub shell radially inwardly of the hub shell.

17. The generator according to claim 16 wherein the magnet rotates together with the rotating member.

18. The generator according to claim 17 wherein the coil is fixed relative to the hub shaft.

19. The generator according to claim 18 wherein the input member comprises the hub shell, and wherein the output member comprises the rotating member.

20. The generator according to claim 19 further comprising:
    a speed sensor that senses a rotational speed of a rotating part of the human powered vehicle; and
    wherein the switching unit couples the rotating member to one of the sun gear, the planet gear carrier or the ring gear so that the rotating member rotates at a speed less than the hub shell when the rotating part rotates at a speed above a selected value, and wherein the switching unit couples the rotating member to one of the sun gear, the planet gear carrier or the ring gear so that the rotating member rotates at a same speed as the hub shell when the rotating part rotates at a speed below the selected value.

* * * * *